July 15, 1969  E. ORSHANSKY, JR  3,455,183
SPLIT-TORQUE HYDROMECHANICAL TRANSMISSION
Filed Aug. 2, 1967  4 Sheets-Sheet 1
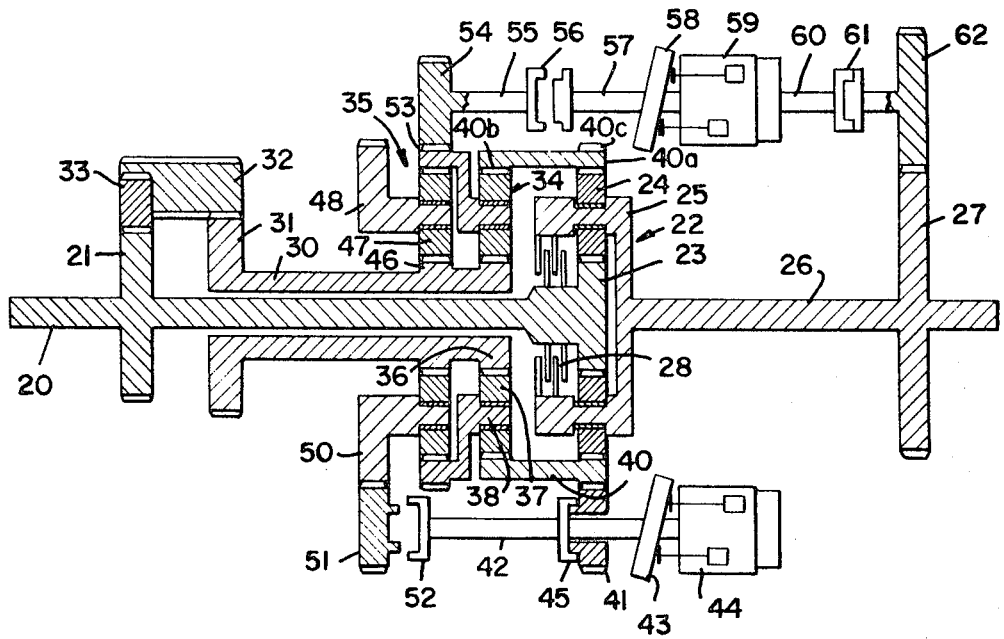
FIG_1
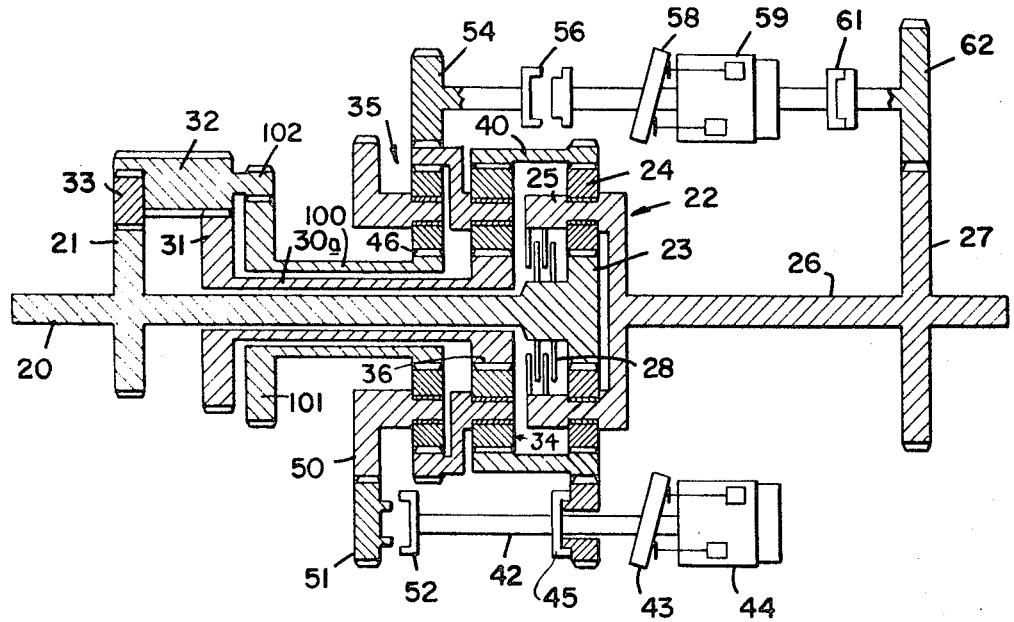
FIG_3
INVENTOR.
ELIAS ORSHANSKY, JR.
BY
Owen, Wickersham & Erickson
ATTORNEYS July 15, 1969  E. ORSHANSKY, JR  3,455,183
SPLIT-TORQUE HYDROMECHANICAL TRANSMISSION
Filed Aug. 2, 1967  4 Sheets-Sheet 2
FIG_2
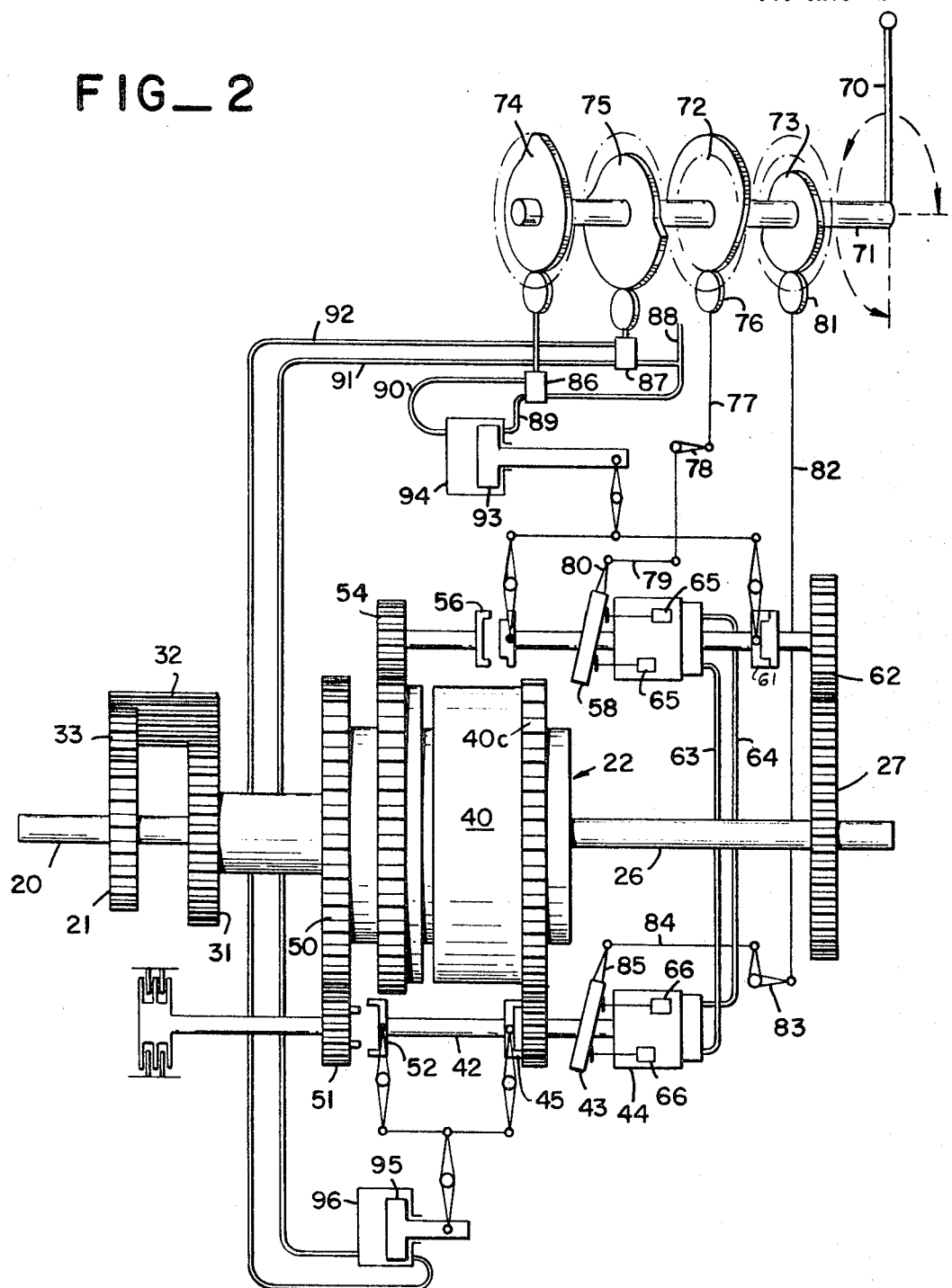
INVENTOR.
ELIAS ORSHANSKY, JR.
BY
Owen, Wickersham & Erickson
ATTORNEYS

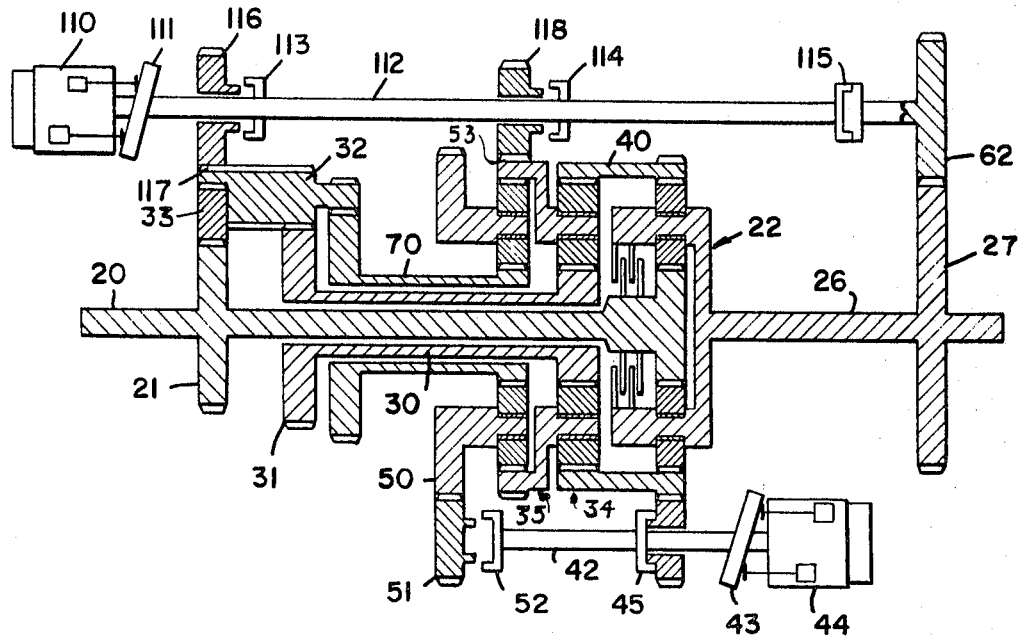
FIG_4

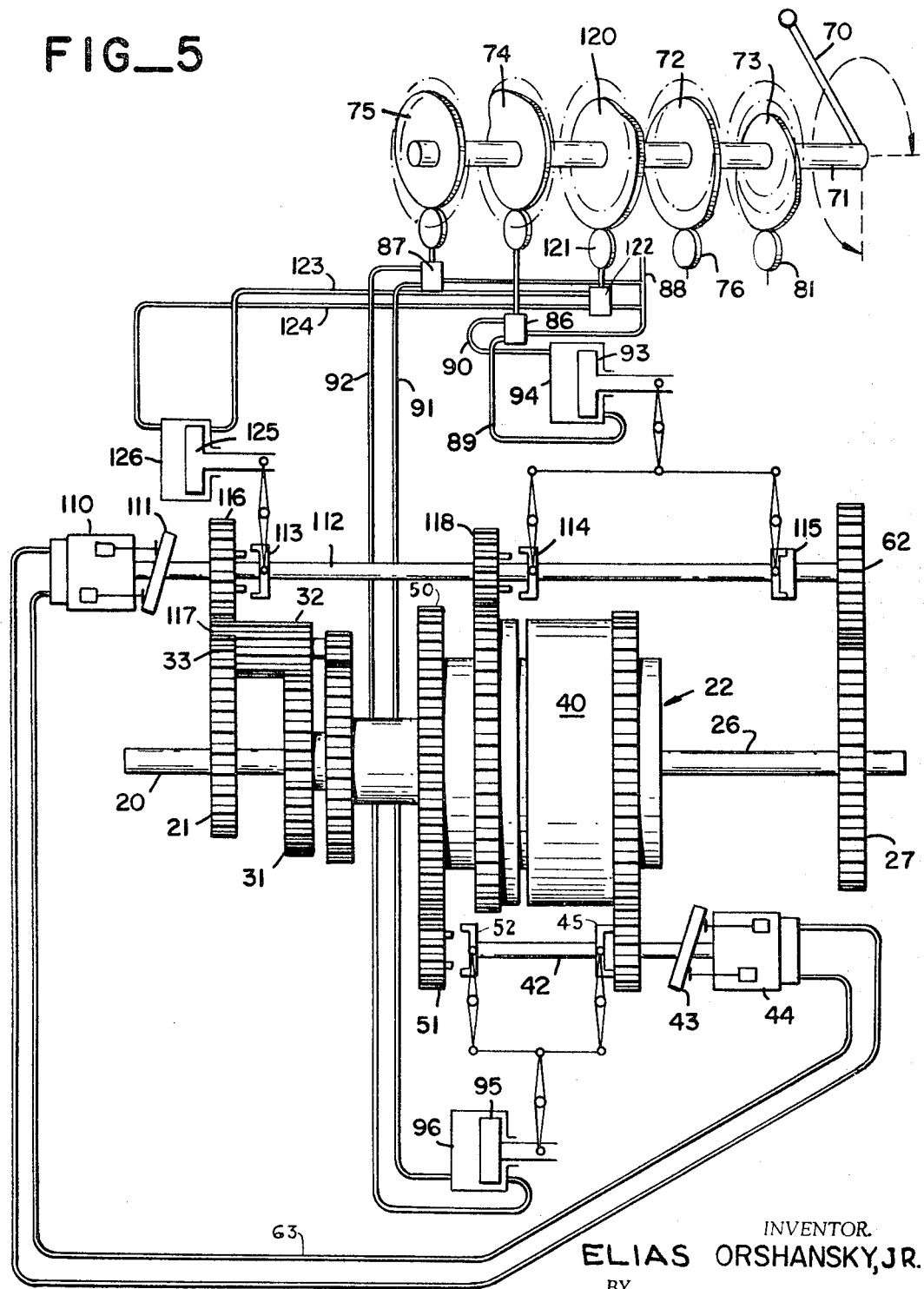
FIG_5

United States Patent Office 3,455,183
Patented July 15, 1969

3,455,183
SPLIT-TORQUE HYDROMECHANICAL TRANSMISSION
Elias Orshansky, Jr., San Francisco, Calif., assignor to URS Corporation, San Mateo, Calif., a corporation of California
Filed Aug. 2, 1967, Ser. No. 657,964
Int. Cl. F16h 47/04
U.S. Cl. 74—687       17 Claims

ABSTRACT OF THE DISCLOSURE

A split-torque transmission with three planetary sets and two interconnected independently variable hydraulic units. A rotary input drives directly set (1)'s input; set (1)'s output directly drives rotary output means and supplies reactive means therefor. Sets (2) and (3) have inputs driven by the rotary input oppositely from set (1)'s input. Set (2)'s output connects in driving relation to set (1)'s reaction means. Set (3)'s output connects in driving relation to the set (2)'s reaction means. Unit (1) operatively connects in driving relation to set (2)'s reaction means, and unit (2) operatively connects in driving relation to set (1)'s reaction means. The magnitude and direction of displacement of each said hydraulic unit are independently varied.

---

This invention relates to an improved split-torque hydromechanical transmission, which is infinitely variable continuously through several modes of operation.

My new transmission can cruise in direct drive, all the power then being transmitted mechanically and none being transmitted hydraulically. In getting up to cruise speed, a typical transmission of this invention of wide variation of reduction range transmits an average of only about twenty-five percent of the power hydraulically, and even at maximum output torque, only sixty-five percent of the power is transmitted hydraulically. It enables a perfect matching of the engine with the transmission, being ideal with both turbine and reciprocating engines.

The invention finds valuable application as a transmission for both trucks and passenger vehicles and other types of vehicles. Unusually high efficiencies are achieved in comparison with all-hydraulic transmissions and prior-art split-torque devices.

In addition to its function as an unusually efficient transmission, my invention also possesses unusual braking advantages. Very low wheel-brake maintenance is achieved by full braking and retarding action of the transmission. It enables complete emergency stops without using the service brakes. Also it provides full hill-holding without engine power.

Beyond these practical features, the transmission of this invention has important structural advantages. It is short, light in weight, inexpensive to manufacture, easily and inexpensively maintained and has a long service life. These features, combined with the high overall fuel-tank-to-wheel efficiency and the outstanding safety features alluded to earlier, provide an outstanding advance over the prior art.

An outstanding feature is that all these effects may be achieved with two small hydraulic pump-motors, three (or more) planetary gear sets, and four or more synchronized clutches, so joined and combined that the transmission progresses from neutral to maximum through four modes—of which the vehicle driver is never aware, because the change is smooth and may be completely automatic, or may be controlled by a hand-operated lever. Modified forms of the invention add some additional elements or eliminate some.

To summarize briefly a typical embodiment of the invention, there is a first planetary gear set whose sun gear is rotated by an input shaft, and the planet gear carrier rotates with the output shaft. A first clutch, optional, enables engagement and disengagement of the input shaft and planet gear carrier, to provide, during such engagement, direct drive of the output shaft by the input shaft. Second and third planetary gear sets each have a sun gear rotating with one or more auxiliary shafts that are concentric with the input shaft, rotating in the opposite direction therefrom. The planet gears of the second set are in engagement with a ring gear which may be the same member as the ring gear of the first set. A first hydraulic motor-pump unit has a swash plate and rotates with another auxiliary shaft which has clutches for connecting it to either the ring gear of the first set or to the planet carrier of the third set, and there is means for controlling the swash plate to place the unit into operation selectively as a motor, as a pump, and as neither. A further auxiliary shaft has thereon a gear in engagement with the ring gear of the third set, and yet another auxiliary shaft is in line with this further auxiliary shaft and clutchable to it, and has a pinion gear thereon in engagement with a gear mounted on the output shaft, and a second hydraulic motor-pump unit has a swash plate and rotates with one of these latter auxiliary shafts. There is means for controlling that swash plate to place the second hydraulic unit into operation selectively as a motor, as a pump, and as neither. Conduits connect the motor-pump units together.

In the embodiment of the invention just described, four modes of forward operation blend smoothly from one to the other successively from starting to highest speeds.

(1) The first hydraulic unit is first operated as a pump while the second hydraulic unit is operated as a motor. The torque is split into a mechanical path and a hydrodynamic path.

(2) The swash plate of the second hydraulic unit is next set to cause the second hydraulic unit to have zero piston stroke. It then blocks flow from the first hydraulic unit, and all power is now transmitted mechanically via the first planetary gear set.

(3) Next, the second hydraulic unit is operated as a pump, and the torque is again split, though the hydrodynamic path is different than before.

(4) Finally, the swash plate of the first hydraulic unit is set to cause zero piston stroke. The first hydraulic unit then blocks flow from the second hydraulic unit. Now there may be direct mechanical drive of the output shaft by the input shaft. It may be remarked that the first clutch need not be engaged; if it is not, it is possible to go into overdrive.

Other objects and advantages of the invention will appear from the following description of some preferred embodiments.

In the drawings:

FIG. 1 is a view in side elevation and in section of a transmission embodying the principles of the invention, with the controls and piping omitted.

FIG. 2 is a diagrammatic view, partly in perspective and partly in side elevation of the transmission of FIG. 1 with the controls and piping shown.

FIG. 3 is a view similar to FIG. 1 of a modified form of the invention.

FIG. 4 is another view similar to FIG. 1, of another modified form of the invention.

FIG. 5 is a view similar to FIG. 2 of the FIG. 4 units.

The transmission of FIGS. 1 and 2

An input shaft 20 is provided with a gear 21 and extends to a first planetary gear set 22 having as input means a sun gear 23 which is in mesh with planet gears 24. A planet carrier 25 serves as output means and is secured to an output shaft 26, which also carries a gear 27 thereon. A clutch 28 is provided for direct engagement between the input shaft 20 and the planetary carrier 25.

Coaxial with the input shaft 20 is a hollow shaft 30 having a gear 31 which is driven by a gear 32, which, in turn, is driven by a gear 33 from the gear 21 so that the shaft 30 rotates in the opposite direction from the shaft 20. The shaft 30 at its opposite end supports second and third planetary sets 34 and 35. The second planetary set 34 includes as input means a sun gear 36 secured to the shaft 30 and engaging planetary gears 37, which are supported by a planetary carrier 38 that serves as output means.

The planetary gears 24 of the first planetary set 22 and the planetary gears 37 of the second planetary set 34 engage the same ring gear member 40, having respective interior ring gear portions 40a and 40b. The ring gear 40 also has an exterior gear portion 40c in engagement with a pinion gear 41 that is rotatable on a shaft 42, which carries a swash plate 43 that operates an hydraulic unit 44. A clutch 45 enables the gear 41 to drive the shaft 42, when the clutch 45 is engaged.

The third planetary set 35 includes as input means a sun gear 46 secured to the shaft 30 and engaging planetary gears 47, which are supported by a planetary carrier 48 that serves as output means. The carrier 48 also carries a gear 50 that engages a pinion gear 51, which, by means of a clutch 52 drives the shaft 42 when the clutch 52 is engaged. Only one of the two clutches 45 and 52 is engaged at any one time.

The planetary gears 47 of the third planetary set 35 also engage the internal teeth of a gear 53 on or secured to the planetary carrier 38 of the second planetary set 34. The external teeth of the gear 53 engage a gear 54 on a shaft 55. The shaft 55 is connectible by a clutch 56 with a shaft 57 carrying a swash plate 58 which operates a hydraulic unit 59. The hydraulic unit 59 is on a shaft 60 which is engageable by means of a clutch 61 with a gear 62, which is in engagement with the gear 27 on the output shaft 26.

The clutches 45, 52, 56, and 61, all of which engage and disengage at near synchronous speeds and while transmitting very low loss torque enable the transmission to be operated in four distinct modes: low speed, medium speed, high speed, and direct lockout cruise speed, with smooth transitions from mode to mode.

The two hydraulic pump-motors 44 and 59, shown diagrammatically, are provided with conduits 63 and 64 (FIG. 2) connecting them. Each swash plate 43 and 58 or other control element actuates a plurality of pistons 65 or 66.

Control of the system and changes from one mode to another may be controlled automatically, or manually by a lever 70 (FIG. 2) that turns a shaft 71 rigidly carrying four cams 72, 73, 74, and 75. The cams are shown in only an approximate form. The cam 72 engages a cam follower 76 to operate a rod 77, bell crank 78, rod 79, and thereby a lever 80 that tilts the swash plate 58 about its pivot. Similarly, the cam 73 engages a cam follower 81 to operate a rod 82, bell crank 83, rod 84, and lever 85 to tilt the swash plate 43 about its pivot.

The cam 74 controls a valve 86, and the cam 75 controls a valve 87. The valves 86 and 87 are connected in a pneumatic or hydraulic system with a fluid supply 88 and conduits 89, 90, 91, and 92. The conduits 89 and 90 control a piston 93 in a cylinder 94 which engages and disengages the clutches 56 and 61, alternately, so that one and only one is engaged at any one time. Similarly, the conduits 91 and 92 control a piston 95 in a cylinder 96 which engages and disengages the clutches 45 and 52.

The lever 70 is moved by the operator as he sees fit, or it may be replaced by or controlled by an automatic or computer-controlled device. The cams 72 and 73 act continuously, while the cam 74 actuates the valves 87 and 88 from one definite position to another, only once for each in the cycle. The same lever 70 may control reverse, by regenerating the power.

At zero output speed, with the input shaft 20 rotating freely, i.e., in a neutral parking position, the hydraulic unit 59, which geared to the output shaft 26 is on maximum stroke, and the hydraulic unit 44, which is geared to the ring 40 of the first planetary set 22, is on zero stroke. Its output is then blocked, except for leakage; so the unit 44 is stationary; while the unit 59 rotates freely.

To start, the stroke of the unit 44 is increased to a maximum value which permits transmission of maximum horsepower. While the stroke of the unit 44 is being increased, pressure in the system is maintained below a design point by preset relief valves (not shown). During this period, the energy dissipated through these valves is completely analogous to the energy dissipated by friction in an engaging clutch.

After the stroke of the unit 44 has been brought to its maximum, the stroke of the unit 59 is decreased gradually to zero. When it is zero, flow from the unit 44 is blocked (again except for leakage), and its speed gradually decreases to zero, at which point the input-to-output speed reduction is given by the planetary ratio of the first planetary set 22. During the entire low speed operation the unit 44 acts as a pump and provides the full reaction torque for the first planetary set 22.

When the unit 59 reaches zero stroke while geared to the output 26 (at which point it transmits essentially zero torque and horsepower) it is disengaged from the output 26 and engaged to the ring 53 of the third planetary set 35. Preferably, all the planetaries have identical ratios. The unit 59 is then brought from zero stroke to its maximum stroke, after which the unit 44 is brought from its maximum stroke to zero stroke. During this entire period, the unit 59 acts as a pump, and the unit 44 acts as a motor. At the beginning of the period, the unit 44 provides all the reaction torque for the planetaries (only the first planetary set 22 is effective) at its end, the unit 59 provides all the reaction torque for the first planetary set 22 and the second planetary set 34, and the unit 44 transmits essentially no torque or horsepower.

The sun gears 36 and 46 of the second and third planetary sets 34 and 35 rotate in a direction opposite to the input at a speed which enables the carrier of the third planetary set 35 to be stationary when output and input speeds are equal.

After the unit 44 reaches zero stroke while geared to the ring 40 of the first planetary set 22, at which point it transmits essentially zero torque and horsepower, it is disengaged from the first planetary set 22 and engaged to the carrier 48 of the third planetary set 35. It is then brought from zero stroke to its maximum stroke, after which the unit 59 is brought from its maximum stroke to zero stroke. During this entire period, the unit 44 acts as a pump and the unit 59 acts as a motor.

Since no external forces are applied to the ring 40 of the planetaries 22 and 34, the torque on the ring exerted by both sets 22 and 34 are equal, so that they can be the same gear. The carrier 48 torque is supplied entirely by the unit 44; the ring 53 torque is supplied partly mechanically through the third planetary set 35, and partly hydraulically by the unit 59. The sum of the mechanical and hydraulic torques on the ring 53 equals the torque on the carrier 38.

When the unit 59 attains zero stroke (and is transmitting neither torque nor horsepower—except for leakage), the ring 40, the carrier 25 (the output), and the sun gear 23 (input) of the first planetary set 22 are moving at uniform speed. The transmission is then in direct drive, and the input 20 can be directly engaged mechanically to the output 20 by the clutch 28. In this mode of operation, neither hydraulic unit 44 or 59 transmits horsepower or torque.

In the form of the invention shown in FIG. 3, there are three concentric shafts: the shaft 20, the shaft 30a (which again rotates the sun gear 36 of the second planetary set 34), and a shaft 100 having a gear 101 driven by a gear 102 that rotates with the gear 32 but is smaller, and on which is the sun gear 46 of the third planetary set 35. Everything else is the same. The use of three concentric shafts 20, 30a, and 100 enables the sun gears 36 and 46 to run at different speeds, determined by the gears 32–31 and 102–101. Then the optimum condition is attained wherein the least percent of horsepower is transmitted hydraulically, and the hydraulic units 44 and 59 can be of the smallest possible size. With two shafts 20 and 30 (as in FIGS. 1 and 2), the hydraulic units 44 and 59 have to be somewhat larger and more horsepower is transmitted hydraulically. In many instances it will be simpler and cheaper to use the two-shaft structures of FIGS. 1 and 2; in other, it will be better to use the three-shaft structures of FIGS. 3–5.

In the form of the invention shown in FIGS. 4 and 5, the only difference is with the elements 54–62. Here, a second hydraulic unit 110 has a swash plate 111 mounted on a shaft 112 having clutches 113, 114, and 115. The clutch 113 can be used to engage the shaft 112 with a pinion gear 116, which is in engagement with gear teeth 117 on the outer face of the gear 32. The clutch 114 can be used to engage the shaft 112 with a gear 118 corresponding to the gear 54, driven by the gear 53. The clutch 115 connects the shaft 112 to the gear 62, as before. This structure provides an overdrive beyond the 1:1 ratio of direct drive, enabling one (for example) to get down to a 0.5+1 drive. The structure is therefore advisable when a wide range of gear ratios is desired. The FIG. 3 structures might, for example, give an 8:1 ratio overall, from an 8:1 ratio to a 1:1 ratio. Then the FIG. 4 structure could give an overall 16:1 ratio from 8:1 to 0.5:1. This is significant where such overdrive is desirable, and this modification shows how it may be obtained.

In FIG. 5, there is, therefore, one additional cam 120 with its follower 121 and valve 122 controlling conduits 123 and 124, which control the clutch 113 through a piston 125 and cylinder 126.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A split-torque transmission for use with a rotary input means and a rotary output means, including in combination:
a first planetary set having input means driven directly by said rotary input means, output means directly driving said rotary output means, and reaction means which supplies reaction for the drive of said rotary output means,
a second planetary set having input means driven by said rotary input means in the opposite direction from the input means of said first planetary set, output means operatively connected in driving relation to the reaction means of said first planetary set, and reaction means,
a third planetary set having input means driven by said rotary input means in the same direction as the input means of said second planetary set, output means connected in driving relation to the reaction means of said second planetary set, and reaction means,
first and second hydraulic units connected together by hydraulic lines, said first unit being operatively connected in driving relation to said reaction means of said second planetary set, said second unit being operatively connected in driving relation to said reaction means of said first planetary set, and
means for independently varying the magnitude and direction of displacement of each said hydraulic unit.

2. The transmission of claim 1 having clutch means for connecting and disconnecting the rotary input means to the output means of said first planetary set.

3. The transmission of claim 1 having clutch means for connecting and disconnecting two of the means of said first planetary set.

4. The transmission of claim 1 wherein said means for independently varying comprises a single system having means for varying continuously from a first mode wherein said second hydraulic unit is inoperative by virtue of being set for zero displacement, to a second mode wherein said first hydraulic unit is operated as a motor and said second hydraulic unit is operated as a pump, to a third mode where said first hydraulic unit is inoperative.

5. The transmission of claim 4 having clutch means for connecting two of the means of said first planetary set and wherein in said first and second modes said clutch means is disengaged and in said third mode said clutch is engaged.

6. The transmission of claim 1 having first clutch means for connecting and disconnecting the rotary input means to the output means of said first planetary set, a first gear associated with said rotary output means, a second gear associated with said reaction means of said second planetary set and in engagement with said first gear and additional clutch means for connecting and disconnecting a driving relation between said second gear and said reaction means of said third gear set.

7. The transmission of claim 1 wherein said input means of said second planetary set and said input means of said third planetary set are rotated at the same speed.

8. The transmission of claim 7 wherein said input means of said second planetary set and said input means of said third planetary set are both on a common shaft that is concentric to a drive shaft driven directly by and comprising part of said rotary input means, said common shaft being driven by said drive shaft through gears for rotation in the opposite direction from said drive shaft.

9. The transmission of claim 1 wherein said input means of said third planetary set is driven at a different rate of speed than said input means of said second planetary set.

10. The transmission of claim 9 wherein said input means of said first, second, and third planetary sets are mounted on three concentric shafts.

11. A split tongue transmission including in combination:
an input shaft,
an output shaft,
a first auxiliary shaft coaxial with and surrounding said input shaft,
means for driving said first auxiliary shaft by and in an opposite rotary direction from said input shaft,
a first planetary gear set including a first sun gear rotated by said input shaft, a first planet carrier carrying a first set of planet gears and rotating with said output shaft, and a first ring gear,
a second planetary gear set including a second sun gear rotating with said first auxiliary shaft and a second planet carrier carrying a second set of planetary gears and a second ring gear directly connected to said first ring gear, a third planetary gear set including a third sun gear rotating with said first auxiliary shaft, a third planet carrier carrying a third set of planetary gears, and a third ring gear directly connected to said second planet carrier, a second auxiliary shaft having first and second clutch means thereon only one of which is engaged at any one time, a first pinion gear engaged with said first ring gear and in driving relation with said second auxiliary shaft when said first clutch means is engaged, a second pinion gear engaged with a gear on said third planet carrier and in driving relation with said second auxiliary shaft when said second clutch means is engaged, a first hydraulic motor-pump unit having a plurality of pistons and a first swash plate and rotating with said second auxiliary shaft and thereby operatively alternatively connected to said first ring gear or to said third planet carrier, depending on which one of said first and second clutch means is engaged, first control means for controlling said first swash plate to place said first hydraulic unit into operation selectively as a motor, as a pump, and as neither, a third auxiliary shaft having a gear mounted thereon in geared engagement with said third ring gear, a fourth auxiliary shaft in line with said third auxiliary shaft, a third clutch means for engaging and disengaging said third and fourth auxiliary shafts, a second hydraulic motor-pump unit having a plurality of pistons and a second swash plate and driven by said fourth auxiliary shaft, second control means for controlling said second swash plate to place said second hydraulic unit into operation selectively as a motor, as a pump, and as neither, a pair of conduits connecting said motor-pump units together, a fifth auxiliary shaft in line with said fourth auxiliary shaft and having a third pinion gear thereon, an additional gear secured to said output shaft in engagement with said third pinion gear, and fourth clutch means for locking said fifth auxiliary shaft to said fourth auxiliary shaft and for unlocking it therefrom.

12. The transmission of claim 11 having fifth clutch means for engaging and disengaging said input shaft and said first planet carrier to provide, during such engagement, direct drive of said output shaft by said input shaft.

13. The transmission of claim 12 wherein said first and second control means are linked together for continuous movement through four modes from starting to high speeds, wherein (1) in a first mode the first hydraulic unit is operated as a pump and said second hydraulic unit is operated as a motor, (2) in a second mode the second hydraulic unit is rendered inoperative and the transmission is solely mechanical, (3) in a third mode the first hydraulic unit is operated as a motor and the second hydraulic unit is operated as a pump, and (4) in a fourth mode the first hydraulic unit is rendered inoperative, and the transmission is solely mechanical.

14. The transmission of claim 13 wherein a single device controls said first and second control means and said clutches and includes means for disengaging said first and second clutch and engaging said third clutch in said first and second modes, for engaging said second clutch and disengaging said first and third clutches in said third mode, and, in said fourth mode, for engaging said first and second clutches and disengaging said third clutch.

15. A split-tongue transmission including in combination:

an input shaft, an output shaft, a first auxiliary shaft concentric with and surrounding said input shaft, a second auxiliary shaft concentric with and surrounding said first auxiliary shaft, gear means for driving said first and second auxiliary shafts at different speeds at a set ratio, by and in a direction of rotation opposite to said input shaft, a first planetary gear set including a first sun gear mounted on said input shaft, a first planet carrier carrying a first set of planet gears and rotating with said output shaft, and a first ring gear, a second planetary gear set including a second sun gear mounted on said first auxiliary shaft and a second planet carrier carrying a second set of planetary gears meshed with a second ring gear integral with said first ring gear, a third planetary gear set including a third sun gear mounted on said second auxiliary shaft, a third planet carrier carrying a third set of planetary gears, and a third ring gear integral with said second planet carrier, a third auxiliary shaft having first and second clutch means thereon, only one of which is engaged at any one time, a first pinion gear engaged with said first ring gear and in driving relation with said third auxiliary shaft when said first clutch means is engaged, a second pinion gear engaged with a gear on said third planet carrier and in driving relation with said third auxiliary shaft when said second clutch means is engaged, a first hydraulic motor-pump unit having a plurality of pistons and a first swash plate and rotating with said third auxiliary shaft and thereby operatively alternatively connected to said first ring gear or to said third planet carrier, depending on which one of said first and second clutch means is engaged, first control means for controlling said first swash plate to place said first hydraulic unit into operation selectively as a motor, as a pump, and as neither, a fourth auxiliary shaft having third and fourth clutch means thereon, only one of which is engaged at any one time, a third pinion gear engaged with said third ring gear and in driving relation with said fourth auxiliary shaft when said third clutch means is engaged, a second hydraulic motor-pump unit having a plurality of pistons and a second swash plate and driven by said fourth auxiliary shaft, second control means for controlling said second swash plate to place said second hydraulic unit into operation selectively as a motor, as a pump, and as neither, a pair of conduits connecting said motor pump units together, a fifth auxiliary shaft in line with said fourth auxiliary shaft and having a fourth pinion gear thereon, an additional gear secured to said output shaft in engagement with said fourth pinion gear, and fifth clutch means for locking said fifth auxiliary shaft to said fourth auxiliary shaft and for unlocking it therefrom.

16. The transmission of claim 15 having sixth clutch means for engaging and disengaging said input shaft and said first planet carrier to provide, during such engagement, direct drive of said output shaft by said input shaft.

17. The transmission of claim 15 having a fifth pinion gear engageable with said gear means and sixth clutch means for locking said fifth pinion gear to said fourth auxiliary shaft at times when said fourth clutch means is disengaged and said fifth clutch means is engaged, for driving said output shaft at speeds faster than the speed of said input shaft.

References Cited

UNITED STATES PATENTS

| 3,203,276 | 8/1965 | Bullard | 74—687 |
| 3,212,358 | 10/1965 | DeLalio | 74—687 |

FOREIGN PATENTS 967,328  8/1964  Great Britain.

OTHER REFERENCES

German printed application, No. 1, 203, 564, Oct. 21, 1965, Muller et al.

DONLEY J. STOCKING, Primary Examiner

THOMAS C. PERRY, Assistant Examiner

PO-1050
(5/69)

UNITED STATES PATENT OFFICE
CERTIFICATE OF CORRECTION

Patent No. 3,455,183          Dated     July 15, 1969

Inventor(s)     Elias Orshansky, Jr.

It is certified that error appears in the above-identified patent and that said Letters Patent are hereby corrected as shown below:

Column 5, line 30, "other" should read -- others --.
Column 6, line 61, "split tongue" should read -- split-torque --.
Column 8, line 1, "split-tongue" should read -- split-torque --.

SIGNED AND
SEALED
FEB 24 1970

(SEAL)
Attest:

Edward M. Fletcher, Jr.
Attesting Officer

WILLIAM E. SCHUYLER, JR.
Commissioner of Patents